(12) United States Patent
Talwerdi

(10) Patent No.: US 8,374,399 B1
(45) Date of Patent: Feb. 12, 2013

(54) APPARATUS FOR AUTHENTICATING STANDARDIZED DOCUMENTS

(75) Inventor: Mehdi Talwerdi, North Vancouver (CA)

(73) Assignee: VeriChk Global Technology Inc., North Vancouver (CA)

( * ) Notice: Subject to any disclaimer, the term of this patent is extended or adjusted under 35 U.S.C. 154(b) by 291 days.

(21) Appl. No.: 12/749,313

(22) Filed: Mar. 29, 2010

Related U.S. Application Data

(60) Provisional application No. 61/164,439, filed on Mar. 29, 2009.

(51) Int. Cl.
*G06K 9/00* (2006.01)
*G06Q 40/00* (2012.01)

(52) U.S. Cl. ............................ 382/112; 382/274; 705/44

(58) Field of Classification Search .......... 382/100–103, 382/112–115, 123, 135–140, 155, 162, 168, 382/173, 181–189, 224, 232, 254, 274, 276, 382/286–294, 305, 312, 321; 702/108; 348/210.99; 235/382; 380/270; 705/35, 44
See application file for complete search history.

(56) References Cited

U.S. PATENT DOCUMENTS

| | | | | |
|---|---|---|---|---|
| 7,702,108 | B2 * | 4/2010 | Amon et al. | 380/270 |
| 7,706,565 | B2 * | 4/2010 | Levy et al. | 382/100 |
| 7,812,860 | B2 * | 10/2010 | King et al. | 348/210.99 |
| 7,850,077 | B2 * | 12/2010 | Talwerdi et al. | 235/382 |
| 7,920,714 | B2 * | 4/2011 | O'Neil | 382/100 |
| 7,949,582 | B2 * | 5/2011 | Mennie et al. | 705/35 |
| 7,996,173 | B2 * | 8/2011 | Schowengerdt et al. | 702/108 |

\* cited by examiner

*Primary Examiner* — Seyed Azarian
(74) *Attorney, Agent, or Firm* — Nexus Law Group LLP; Nicholas P. Toth

(57) ABSTRACT

An apparatus for authenticating a standardized document is provided. The apparatus includes: (a) a detector operable to detect the presence of the standardized document when the standardized document is being received by the apparatus; (b) a source operable to illuminate the standardized document; and (c) an imaging device operable to capture for authentication an image of the standardized document, wherein the apparatus is operable to determine its location. The apparatus may include a communications module operable to transmit a communication containing information selected from the group consisting of: an indication of time, an indication of location, an indication of the presence of the standardized document, a digital representation of the image, an identification of the standardized document, an indication whether the standardized document has been authenticated, and an indication of a parameter of the apparatus.

20 Claims, 5 Drawing Sheets

APPARATUS FOR AUTHENTICATING STANDARDIZED DOCUMENTS

BACKGROUND OF THE INVENTION

1. Field of Invention

This invention relates to optical imaging and detection and, in particular, to an apparatus for authenticating standardized documents.

2. Description of Related Art

Documents of a standardized size include passports, birth certificates, driver's licences, identity cards, health care cards, bank notes, and other government issued documents. Standards exist to ensure that such documents are of a similar size. For example, a standard passport is typically about 90×125 mm (or 3.5×4.9 inches), although the standard size for a German passport is slightly larger than for passports of other countries.

Various devices have been developed to detect or authenticate standardized documents. For example, an apparatus and method for verifying the authenticity of a value item, which may include a standardized document, is disclosed in the international publication No. WO 2006/021083 published on 2 Mar. 2006, naming TALWERDI et al. as inventors, and entitled APPARATUS AND METHOD FOR SECURE IDENTIFICATION OF SECURITY FEATURES IN VALUE ITEMS, which is incorporated herein by reference for all purposes. Also, an apparatus and method for detecting an item, which may include a standardized document, is disclosed in the international publication No. WO 2008/034250 published on 27 Mar. 2008, naming TALWERDI as inventor, and entitled APPARATUS AND METHOD FOR SECURE DETECTION OF AN ITEM AND A METHOD OF SECURING ACCESS TO INFORMATION ASSOCIATED WITH THE ITEM, which is incorporated herein by reference for all purposes.

Some embodiments of these detection devices include a housing dimensioned to receive an item such as a document, the housing having a support plate for supporting the standardized document being detected or authenticated. Within the housing are sources for producing electromagnetic radiation and an imaging device for producing an image of the document. Detection occurs by the sources generating electromagnetic radiation incident upon the document and the imaging device receiving electromagnetic radiation that has reflected from the document.

There is the known problem of undesirable reflections occurring within the housing that result in the imaging device imaging objects other than the desired document.

Some conventional imaging devices use arrangements of optical lenses and filters to avoid undesirable reflections. However, the use of optical lenses or filters increases complexity and manufacturing costs.

Some conventional devices for authenticating standardized documents scan along only one line of the standardized document at a time. However, such conventional devices require the standardized document, or corresponding scanning components, to travel along a path while being scanned, thereby increasing the time required to image an entire standardized document.

It is desirable for a device capable of detecting or authenticating a standardized document to have a length and width comparable to that of the largest standardized document being detected or authenticated.

SUMMARY

The above shortcomings may be addressed by providing, in accordance with one aspect of the invention, an apparatus for authenticating a standardized document. The apparatus includes: (a) a source operable to illuminate the standardized document; (b) an imaging device operable to capture for authentication an image of the standardized document; and (c) a blind dimensioned to impede the apparatus from imaging an apparatus feature when the imaging device is capturing the image.

The apparatus feature may be the source. The blind may be dimensioned to block illumination emitted from the source so as to cause a shadow region directed toward at least a portion of the standardized document. The apparatus may include a second source operable to illuminate the standardized document. The blind may be further dimensioned to block illumination emitted from the second source so as to cause a second shadow region directed toward at least a second portion of the standardized document. The shadow region and the second shadow region may be non-overlapping. The source may be operable to provide illumination at the second shadow region. The second source may be operable to provide illumination at the shadow region. The source and the blind may be disposed on a side of the imaging device opposite the second source and the second blind. The blind may include a plurality of nested masks. The blind may include a cut-out dimensioned to expose a machine readable zone of a passport document. The apparatus may include a presence detector operable to detect the presence of the standardized document. The imaging device may be operable to capture the image when the presence of the standardized document is being detected by the presence detector. The apparatus may include a communications module operable to transmit a communication containing information selected from the group consisting of: an indication of time, an indication of location, an indication of the presence of the standardized document, a digital representation of the image, an identification of the standardized document, an indication whether the standardized document has been authenticated, and an indication of a parameter of the apparatus.

The apparatus may include a housing dimensioned to house the source, the imaging device and the blind. The housing may include a support dimensioned to receive the standardized document at an outer side of the support. The apparatus feature may include the housing. The support may include a substantially transparent sheet having a perimeter corresponding to outer dimensions of the standardized document. The support may be anti-reflective at an inner side thereof opposite the outer side. The support may include a bracket dimensioned to receive the standardized document. The apparatus may include a presence detector operable to determine whether the bracket is receiving the standardized document. The presence detector may be operable to cause the imaging device to capture the image when the presence detector has determined the standardized document is being received by the bracket. The blind may be disposed between the source and the support. The blind may be dimensioned to block a single-reflection path extending from the source to the support at an incident point thereof and from the incident point to the imaging device. The apparatus may include a second source operable to illuminate the standardized document. The blind may be dimensioned to block a second single-reflection path extending from the second source to the support at a second incident point thereof and from the second incident point to the imaging device. The source may be operable to provide illumination at the second incident point. The second source may be operable to provide illumination at the incident point. The source and the blind may be disposed on a side of the imaging device opposite the second source and the second blind.

The housing may include one or more walls extending from the perimeter to a base. The imaging device may be disposed at the base. The source and the second source may be disposed at the base on opposing sides of the imaging device. The blind may include a first mask projecting from the base. The first mask may include a first mask portion extending adjacently to the one or more walls between the source and the one or more walls. The first mask may include a second mask portion projecting inwardly toward a center of the housing. The blind may include a second mask projecting from the base. The second mask may include a third mask portion extending adjacently to the one or more walls between the second source and the one or more walls. The second mask may include a fourth mask portion projecting inwardly toward a center of the housing. The blind may include a third mask projecting inwardly from the one or more walls between the support and the first and second masks. The third mask may include a cut-out dimensioned to expose a machine readable zone of a passport document.

The apparatus may include a wireless communications antenna disposed at the one or more walls. Each of the first and second sources may be operable to emit electromagnetic radiation having wavelengths within a plurality of wavelength ranges. Each source may include a plurality of emitters. Each emitter may be operable to emit electromagnetic radiation having a wavelength within at least one wavelength range. Each source may include a first emitter operable to emit electromagnetic radiation having a wavelength within the ultraviolet radiation range, a second emitter operable to emit electromagnetic radiation having a wavelength within the visible light wavelength range, and a third emitter operable to emit electromagnetic radiation having a wavelength within the infrared radiation range. Each of the first emitter, the second emitter and the third emitter may be a light emitting diode.

The apparatus may include a plurality of the imaging devices, each of the imaging devices being operable to capture for authentication a respective image of a respective portion of the standardized document. Each of the imaging devices may have associated therewith a respective source and a respective blind. Each of the imaging devices may be operable to capture for authentication a respective image of a respective portion of the standardized document. The respective blind may be disposed between the respective source and the support. The respective blind may be dimensioned to block a respective single-reflection path extending from the respective source to the support at a respective incident point thereof and from the respective incident point to each of the imaging devices.

In accordance with another aspect of the invention, there is provided an apparatus for authenticating a standardized document. The apparatus includes: (a) illumination means for illuminating the standardized document; (b) imaging means for capturing an image of the standardized document, thereby permitting the apparatus to authenticate the standardized document; and (c) illumination blocking means for impeding the apparatus from imaging an apparatus feature when the imaging means is capturing the image. The apparatus may include housing means for housing the illumination means, the imaging means and the illumination blocking means. The housing means may include support means for receiving the standardized document.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

An apparatus for authenticating a standardized document includes: (a) illumination means for illuminating the standardized document; (b) imaging means for capturing an image of the standardized document, thereby permitting the apparatus to authenticate the standardized document; and (c) illumination blocking means for impeding the apparatus from imaging an apparatus feature when said imaging means is capturing said image. The apparatus may include housing means for housing said illumination means, said imaging means and said illumination blocking means, wherein said housing means includes support means for receiving the standardized document.

Figure 1:
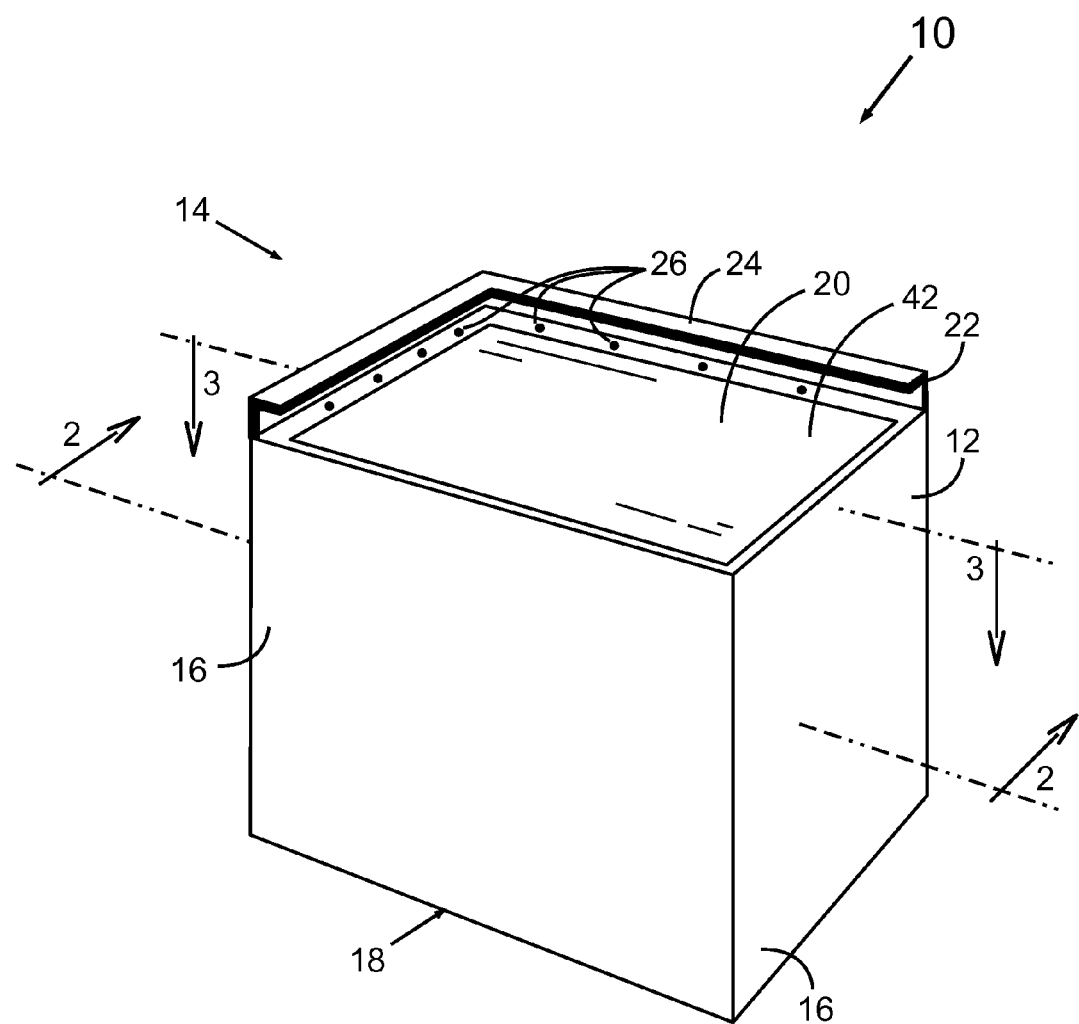
FIG. 1 is a perspective view of an apparatus for authenticating a standardized document according to a first embodiment of the invention.

Referring to FIG. 1, the apparatus according to a first and preferred embodiment of the invention is shown generally at 10. The apparatus 10 functions to image standardized documents (not shown) for the purpose of authenticating such standardized documents. In some embodiments, the apparatus 10 is operable to authenticate a standardized document imaged by the apparatus 10. In some embodiments, the apparatus 10 is operable to store, transmit, or both store and transmit information for subsequent analysis, including authentication analysis.

The apparatus 10 includes a housing 12 having a top region 14, and walls 16 that extend from the top region 14 to a base 18. The housing 12 or any portion thereof may be made of any suitable material, including metal, plastic, rubber, etc., and any combination thereof.

At the top region 14 of the housing 12 is a support 20 dimensioned to support a standardized document being imaged by the apparatus 10. The support 20 is preferably sufficiently transparent for operation of the apparatus 10, and may be made of glass, plexiglass, plastic or other suitable materials and combinations thereof. In the first embodiment, the support 20 has a perimeter that corresponds to outer dimensions of the standardized document, such as by having a length and width substantially equal to an average, typical or maximum length and width of the standardized document.

The housing 12 also includes a bracket 22, which is located at the top region 14 and advantageously facilitates use of the apparatus 10. In typical use where the apparatus 10 is positioned upright as shown in FIG. 1, a standardized document is placed on top of the support 20 such that the standardized document abuts the bracket 22 beneath the upper flange 24 of the bracket 22. Although the bracket 22 assists positioning of the standardized document, the standardized document may be aligned adjacent the support 20 without the use of the bracket 22. Some embodiments of the invention do not include the bracket 22. In some embodiments, the bracket 22 does not include the upper flange 24, and receives a standardized document without the use of the upper flange 24.

In variations of use, the apparatus 10 need not be positioned upright as shown in FIG. 1. In general, the apparatus 10 may be oriented at any angle. For example, the apparatus 10 may suitably used when mounted on a desk, building wall or other structure (not shown in FIG. 1) with the support 20 side of the apparatus 10 projecting from the structure in a lateral direction, downward direction, upward direction, or angled in any direction.

In the first embodiment, the apparatus 10 is operable to detect the presence of a standardized document positioned on top of or otherwise adjacent to the support 20. In the first embodiment, the presence of a standardized document is detected when the standardized document is being received by the bracket 22 within the space defined between the upper flange 24 and the housing 12. The apparatus 10 in the first embodiment includes one or more detectors 26 operable to detect the presence of the standardized document being received by the bracket 22. The detectors 26 may be implemented in any suitable manner, including as optical beam detectors in which the presence of the standardized documents interrupts an optical beam extending between optical beam sources and optical beam receptors of the detectors 26, thereby indicating the presence of the standardized document. Such optical beam sources may be located at the upper flange 24 and the optical beam receptors located at the housing 12, including possibly at the support 20. Additionally or alternatively, one or more optical beam sources may be located at the housing 12 and one or more optical beam receptors may be located at the upper flange 24, for example. In some embodiments, one or more optical beam sources and one or more optical beam receptors are both located at the housing 12, and the upper flange 24 has a reflective surface for redirecting optical beams from optical beam sources to corresponding optical beam receptors. Additionally or alternatively, one or more optical beam sources and one or more optical beam receptors can be both located at the upper flange 24, with the housing 12 having a reflective surface for redirecting optical beams from optical beam sources to corresponding optical beam receptors. In some embodiments, the detectors 26 are proximity detectors that determine whether an object is located within a specifiable proximity to the detectors 26. Additionally or alternatively, the detectors 26 may be implemented as motion detectors that sense motion of an object within a specifiable range. Additionally or alternatively, the presence detector may detect the presence of the standardized document by a mechanical mechanism such as by a switch or other actuator receiving a force exerted when positioning the standardized document, by a pressure sensor operable to detect pressure exerted when positioning the standardized document, or any combination thereof for example. The detectors 26 may be located at the housing 12 (e.g. FIG. 1), at the upper flange 24, between the housing 12 and the upper flange 24, including mounted to the bracket 22, or any combination thereof for example.

In typical use of the first embodiment, a standardized document is positioned adjacent the support 20 such that it is received by the bracket 22. The presence detectors 26 detect that the standardized document is being received by the bracket 22 and produce an electronic indication of the standardized document's presence. The apparatus 10 is operable in response to the presence of the standardized document to image the standardized document for authentication. Thus, the apparatus 10 is advantageously operable to image a standardized document for authentication without requiring a user perform any actuation operation apart from positioning the standardized document.

Additionally or alternatively, some embodiments of the invention include an actuator (not shown) for initiating the imaging and/or authentication processes. Such actuator may be a mechanical switch available for use by a user, for example. Additionally or alternatively, the apparatus 10 may be operable to initiate imaging and/or authentication processes in response to a signal, such as a signal received by the apparatus 10 from a computer or other automated device in accordance with a communications protocol, or any other suitable software switch or other automated means. The apparatus 10 may be embedded within such automated device or other equipment, for example. Embodiments of the invention embedded within equipment may be suitably implemented without the walls 16, for example.

Preferably, the housing 12 and the support 20 have perimeters substantially corresponding to the dimensions of a standardized document. In the first embodiment shown in FIG. 1, the support 20 has a length and a width particularly suitable for imaging a passport document for authentication. Different embodiments may be dimensioned to correspond to differently sized standardized documents. For example, some embodiments may have dimensions particularly suitable for imaging documents such as birth certificates, driver's licences, etc.

In at least some embodiments, the apparatus 10 is operable to determine the position, size or both the position and the size of a standardized document that has been received by the apparatus 10. For example, the apparatus 10 may be operable to determine from the output of multiple detectors 26 where a standardized document has been placed relative to the support 20. Additionally or alternatively, the apparatus 10 in some embodiments is operable to determine the type of standardized document that has been received by the apparatus 10. For example, an embodiment in which the support 20 is dimensioned to correspond to the dimensions of a passport document may be operable to authenticate such passport documents and also birth certificates and driver's licences. In such example, the apparatus 10 may be operable to determine whether a passport document or a smaller wallet-card sized document, such as a birth certificate or a driver's licence, is being received by the apparatus 10. In further embodiments, the apparatus 10 may be operable to identify the type of standardized document that is being received by the apparatus 10 among different standardized documents of the same dimensions (e.g. wallet-card sized documents) by analysis of images taken of the standardized document which is being received by the apparatus 10.

Figure 2:
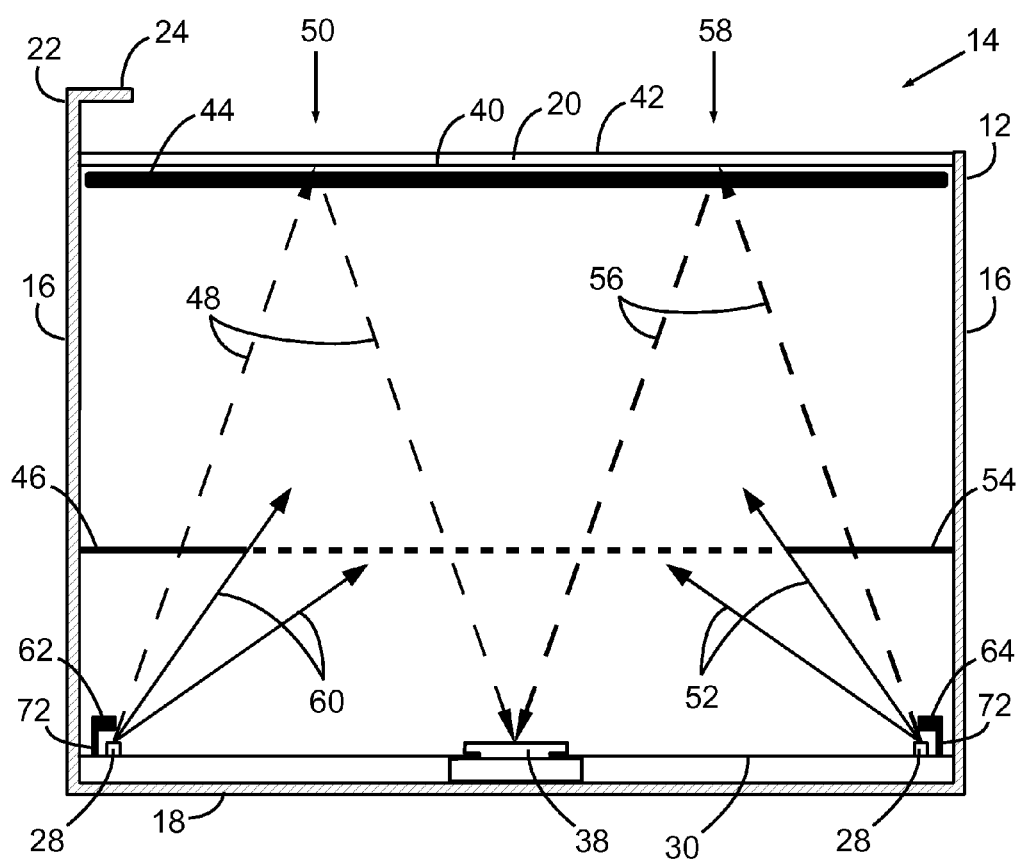
FIG. 2 is a sectional view along lines 2-2 of FIG. 1 of the apparatus shown in FIG. 1, showing a pair of light emitting diodes (LEDs) operable to illuminate opposing shadow regions associated with opposing LEDs of the pair.
Figure 3:
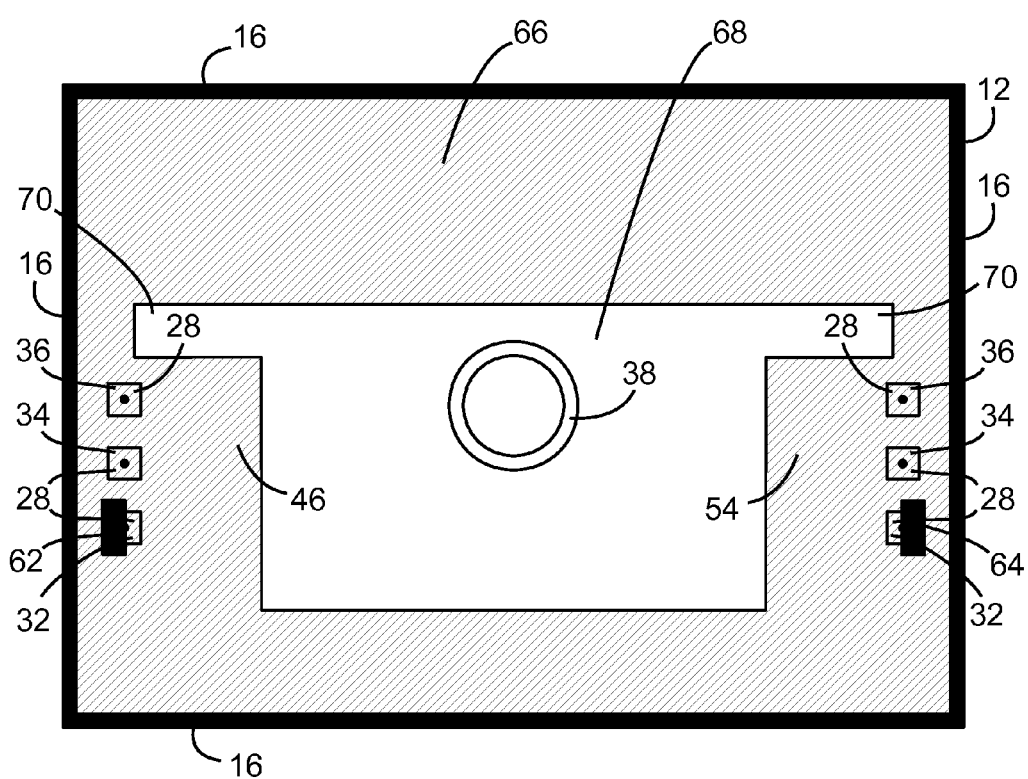
FIG. 3 is a sectional view along lines 3-3 of FIG. 1 of the apparatus shown in FIG. 1, showing a mask disposed above pairs of LEDs.

Referring to FIGS. 2 and 3, the apparatus 10 in the first embodiment includes sources such as the light-emitting diodes (LEDs) 28 located at the base 18. Each LED 28 is operable to provide illumination, including illumination of electromagnetic radiation having a wavelength within the electromagnetic spectrum. The LEDs 28 in the first embodiment include opposing pairs of LEDs 28 located on opposite sides of the housing 12 and mounted on a printed circuit board (PCB) 30. In the first embodiment, the LEDs 28 are mounted on the PCB 30 such that the electromagnetic radiation emitted by the LEDs 28 project generally upwardly toward the top region 14 or a portion thereof. In some embodiments, one or more LEDs 28 are mounted at an angle relative to the plane of the PCB 30. Additionally or alternatively, the PCB 30, or portion thereof, may be angled relative to the base 18 and/or the walls 16. The angle between one or more of the LEDs 28 and the PCB 30, base 18 and/or walls 16 may be between zero and ninety (90) degrees, for example. Additionally or alternatively, one or more LEDs 28 may be mounted adjacent one or more of the walls 16. While the Figures show a total of six LEDs 28 mounted to the PCB 30, in general the apparatus 10 may include any number of LEDs 28, including mounting along one or more of the four side edges of the PCB 30 rows of any number of LEDs 28 operable to illuminate electromagnetic radiation having the same or differing wavelength ranges.

The LEDs 28 typically emit electromagnetic radiation within a ray cone having a projection angle or breadth.

In the first embodiment as best seen in FIG. 3, the LEDs 28 include include opposing pairs of infra-red (IR) LEDs 32, opposing pairs of visible light LEDs 34, and opposing pairs of ultraviolet (UV) LEDs 36. In variations of embodiments, other LEDs 28 operable to produce electromagnetic radiation having wavelengths in other regions of the electromagnetic spectrum may be suitably employed. In some embodiments, the LEDs 28 operable to produce electromagnetic radiation having wavelengths in extended or multiple regions of the electromagnetic spectrum are within the scope contemplated by the present invention.

The apparatus 10 preferably includes at least one illumination source, and at least one imaging device such as the camera 38. In the first embodiment, the camera 38 is mounted at the base 18 of the housing 12 between opposing pairs of LEDs 28.

In typical operation, the LEDs 28 emit electromagnetic radiation in a ray cone projecting generally toward the top region 14 until the electromagnetic radiation impinges the support 20. The support 20 is typically anti-reflective, such as by having an anti-reflection coating on the inner side 40 of the support 20. Electromagnetic radiation transmitted through the support 20 impinges any object, such as the standardized document, positioned at the outer side 42 of the support 20. Electromagnetic radiation reflecting from the standardized document in a generally downward direction toward the base 18 is transmitted through the support 20 and enters the interior of the housing 12 where it may be imaged by the camera 38. The camera 38 thereby images the standardized document and the apparatus 10 produces a digital representation of images and/or related information for authenticating the standardized document.

In the first embodiment, the apparatus 10 is operable to transmit image results, and information in response to such image results, by wireless communication to a central computer or other receiver (not shown). Such information may include a time at which an image is captured, a time at which a standardized document is authenticated, a location of the apparatus 10 at a particular time, results of analyses performed subsequent to capturing an image, a presence indicator indicating the presence of the standardized document, or any combination thereof for example. The analysis results may include authentication information, an indication as to whether a given standardized document has been authenticated, an identity of a standardized document, authentication parameters or other apparatus 10 parameters, or any combination thereof for example.

In the first embodiment, the apparatus 10 includes processing circuitry (not shown) and memory circuitry (not shown) for implementing process functions of the apparatus 10 such as image analysis, data communications, control and other functions of the apparatus 10, for example. The processing and memory circuitry may be operable to determine the location of the apparatus 10, and may include location determination circuitry (not shown) for determining the location of the apparatus 10. In some embodiments, the apparatus 10 is operable to determine its location at different times, and to track and log changes in the location of the apparatus 10. The location determination circuitry may include a Global Positioning System (GPS) or a wireless internet based location determination system such as a Wi-Fi (trademark) based location tracking system, for example. In some embodiments, the apparatus 10 is operable to determine its location by wireless internet based techniques when the apparatus 10 is within a defined area, such as within a selected building or portion thereof, and to determine its location by the GPS when outside of the defined area. In some embodiments, the apparatus 10 is operable to determine whether the location of the apparatus 10 is within a user specifiable permitted zone, and to communicate, such as by wireless communications, an alert or other status information indicating whether the location of the apparatus 10 at a given time is within the permitted zone.

As shown in FIG. 2, the apparatus 10 in the first embodiment includes a radio-frequency (RF) antenna 44 for wireless communications. The RF antenna in the first embodiment is mounted within the housing 12 by antenna brackets (not shown) adjacent the inner side 40 of the support 20. In the first embodiment, the antenna 44 extends along the inner edge of the walls 16, thereby forming a closed loop antenna having a loop plane substantially parallel to the support 20. In such arrangement, the apparatus 10 advantageously provides an unobstructed optical path through the loop of the antenna 44. However, other than arrangements are possible. For example, a closed loop antenna may be located such that its loop plane is within or otherwise parallel to a wall 16, or portion thereof, which may be made of a non-metallic material, for example. In variations, the housing 12 itself, or a portion thereof, may form the RF antenna. Antenna types other than a closed loop antenna may be employed.

Still referring to FIGS. 2 and 3, the apparatus 10 in the first embodiment includes mechanisms for directing the electromagnetic radiation emitted by the LEDs 28 to create one or more shadow regions associated with the LEDs 28, thereby advantageously inhibiting the camera 38 from imaging features other than those of the standardized document being received by the bracket 22.

As shown at the left half of FIG. 2, a left side mask section 46 prevents the electromagnetic radiation beam 48 (shown by dotted line at the left side of FIG. 2) from traveling from the left side LED 28 to the inner side of the support 20 and being reflected from the inner side of the support 20 to arrive at the camera 38. Thus, the camera 38 is advantageously prevented from receiving a singly reflected beam image of the left side LED 28 itself. The left side mask section 46 creates a shadow region 50 where the beam 48 is prevented from impinging on the support 20. In the exemplary embodiment shown in FIGS. 2 and 3, the shadow region 50 extends along the support 20 rightward from the particular wall 16 shown at the left of FIG. 2 to at least to the point where the beam 48 is prevented from impinging on the support 20. To facilitate the camera 38 in imaging the standardized document within the shadow region 50, the right side LED 28 shown on the right half of FIG. 2 is not blocked from illuminating the shadow region 50. While, the unblocked electromagnetic radiation beams 52 emitted from the right side LED 28 illuminates the shadow region 50, no unblocked electromagnetic radiation beam 52 can arrive at the camera 38 subsequent to a single reflection at the inner side of the support 20, thereby advantageously inhibiting the camera 38 from imaging the right side LED 28.

Conversely, a right side mask section 54 prevents the electromagnetic radiation beam 56 (shown by dotted line at the right side of FIG. 2) from traveling from the right side LED 28 to the inner side of the support 20 and being reflected from the inner side of the support 20 to arrive at the camera 38. Thus, the camera 38 is prevented from receiving a singly reflected beam image of the right side LED 28 itself. The right side mask section 54 creates a shadow region 58 where the beam 56 is prevented from impinging on the support 20. In the exemplary embodiment shown in FIGS. 2 and 3, the shadow region 58 extends along the support 20 leftward from the particular wall 16 shown at the right of FIG. 2 to at least to the point where the beam 48 is prevented from impinging on the support 20. To facilitate the camera 38 in imaging the standardized document within the shadow region 58, the left side LED 28 shown on the left half of FIG. 2 is not blocked from illuminating the shadow region 58. While, the unblocked electromagnetic radiation beams 60 emitted from the left side LED 28 illuminates the shadow region 58, no unblocked electromagnetic radiation beam 60 can arrive at the camera 38 subsequent to a single reflection at the inner side of the support 20, thereby advantageously inhibiting the camera 38 from imaging the left side LED 28.

Thus, opposing mask sections 46 and 54 block illumination from opposing LEDs 28 of a given pair of LEDs 28 to create shadow regions 50 and 58 that are illuminated by the other of the opposing LEDs 28, thereby advantageously inhibiting the apparatus 10 from imaging the LEDs 28 themselves. In the first embodiment shown in FIG. 2, each of the shadow regions 50 and 58 cover substantially adjacent, non-overlapping halves of the support 20.

Furthermore, features of the apparatus 10 that may be prevented from being undesirably imaged by the camera 38 include not only the LEDs 28 themselves but also other features. For example, the housing 12 may include mechanical features such as components for mounting the RF antenna 44, the RF antenna 44 itself, ridges or other non-uniformities along walls 16, components related to the PCB 30 that are visible from the interior of the housing 12 above the base 18, etc. Imaging of such apparatus 10 features may be inhibited by blocking electromagnetic radiation traveling from the apparatus 10 features to the camera 38, including electromagnetic radiation paths traveling from one or more LEDs 28 to apparatus 10 features that reflect from such apparatus 10 features and travel to the camera 38. Other electromagnetic radiation paths that may be advantageously blocked include paths from one or more apparatus 10 features to the support 20 that reflect from the support 20 and travel to the camera 38. In some embodiments, the apparatus 10 includes left and right lower mask sections 62 and 64 for further inhibiting the apparatus 10 from imaging apparatus 10 features. The left and right lower mask sections 62 and 64 block or otherwise disrupt electromagnetic radiation being emitted by the LEDs 28 at points closer to the LEDs 28 than corresponding points of the left and right mask sections 46 and 54, respectively. Such electromagnetic radiation disruption at the left and right lower mask sections 62 and 64 advantageously further inhibit paths of illumination from arriving at the camera 38 from apparatus 10 features after a comparatively small number of reflections, and advantageously further inhibit coherency of electromagnetic radiation beams reflecting from apparatus 10 features.

As shown in FIG. 2, the left side mask section 46 and the right side mask section 54 are preferably dimensioned such that all portions of the standardized document relevant to authentication are within the field of view of the camera 38, unrestricted by the left side mask section 46 and the right side mask section 54, when the standardized document is being received by the bracket 22.

Referring to FIG. 3, the left and right mask sections 46 and 54 in the first embodiment form part of a single mask 66 suitably dimensioned for blocking undesirable electromagnetic radiation paths. For ease of description and illustration, the mask 66 is shown in FIG. 3 by hatching, which renders visible the LEDs 28 and the left and right lower mask sections 62 and 64 disposed beneath the mask 66. Preferably, the mask 66 is made of an opaque material. In the first embodiment, the mask 66 and the left and right lower mask sections 62 and 64 are non-reflective, such as by having a non-reflective coating or otherwise being made of a non-reflective material for example. The mask 66 and the left and right lower mask sections 62 and 64 are typically black in colour to maximize their absorption of light. Other materials, coatings and colours for absorbing electromagnetic radiation may be suitably employed.

As shown in FIG. 3, the mask 66 includes a cut-out 68 for permitting electromagnetic radiation emitted from the LEDs 28 to project toward the support 20 at configurable angles of projection. The cut-out 68 advantageously creates the shadow regions 50 and 58 in respect of the left side LEDs 28 and the right side LEDs 28, respectively. Additionally, the cut-out 68 is advantageously dimensioned to permit electromagnetic radiation from the left side LEDs 28 to illuminate the shadow region 58 and electromagnetic radiation from the right side LEDs 28 to illuminate the shadow region 50.

In some embodiments particularly suitable for imaging standard passport documents, the cut-out 68 is dimensioned to include a cut-out flange section 70 which advantageously permits additional electromagnetic radiation to impinge upon that portion of the standard passport document associated with a machine readable zone (MRZ) when the standard passport document is being received by the bracket 22.

Additionally or alternatively to the use of mask sections for creating shadow regions, other mechanisms for inhibiting the camera 38 from imaging features other than those of the standardized document may be employed. For example, in some embodiments one or more LEDs 28 are disposed within the apparatus 10 at angles relative to the PCB 30, base 18 and/or walls 16. Mounting the LEDs at an angle relative to the PCB 30, base 18 and/or walls 16 may render the use of mask sections unnecessary for creating shadow regions, or may permit the use of mask sections having alternate dimensions. By way of further example, where the LEDs 28 emit electromagnetic radiation projecting within a known ray cone, appropriately mounting the LEDs 28, the PCB 30 or portion thereof, or both the LEDs 28 and the PCB 30 or portion thereof, at an angle relative to the base 18 suitably creates shadow regions outside of the ray cone of emitted electromagnetic radiation. In some embodiments, the shadow regions 50 and 58 are suitably created by directing the ray cone of projected electromagnetic radiation from the left and rights side LEDs 28 toward opposing halves of the support 20. In such embodiments, the components within or inherent to the LEDs 28 constitute a blind dimensioned to impede the apparatus 10 from imaging apparatus 10 features.

By way of further example, one or more LEDs 28 may be operable to emit electromagnetic radiation projecting within an angled ray cone (not shown). In such example, the angled ray cone of such LEDs 28 define a shadow region outside of the angled ray cone. Appropriately mounted LEDs 28 having angled ray cones of projected electromagnetic radiation may suitably define the shadow region 50 and/or shadow region 58 such that components within or inherent to the LEDs 28 causing the angled ray cone constitute a blind dimensioned to impede the apparatus 10 from imaging apparatus 10 features.

In the exemplary embodiment shown in FIG. 3, the left and right lower mask sections 62 and 64 cover a portion of the IR LEDs 32. However, in general any number of lower mask sections may partly or entirely cover one or more of the LEDs 28. In some embodiments, the left and right lower mask sections 62 and 64 project laterally from respective walls 16. In the first embodiment, however, the left and right lower mask sections 62 and 64 include vertical portions 72 (FIG. 2) to further block or otherwise disrupt electromagnetic radiation being emitted by the LEDs 28. In variations of embodiments, any number of mask sections nested at any number of different distances between the base 18 and the support 20 may block or otherwise disrupt electromagnetic radiation being emitted by the LEDs 28, thereby constituting a blind dimensioned to impede the apparatus 10 from imaging apparatus 10 features. A given blind may be formed from any number of masks or mask sections thereof, including nested masks or mask sections thereof, source components, inherent properties of a source, or any combination thereof. The apparatus 10 may include a plurality of blinds.

Additional Embodiments

Figure 4:
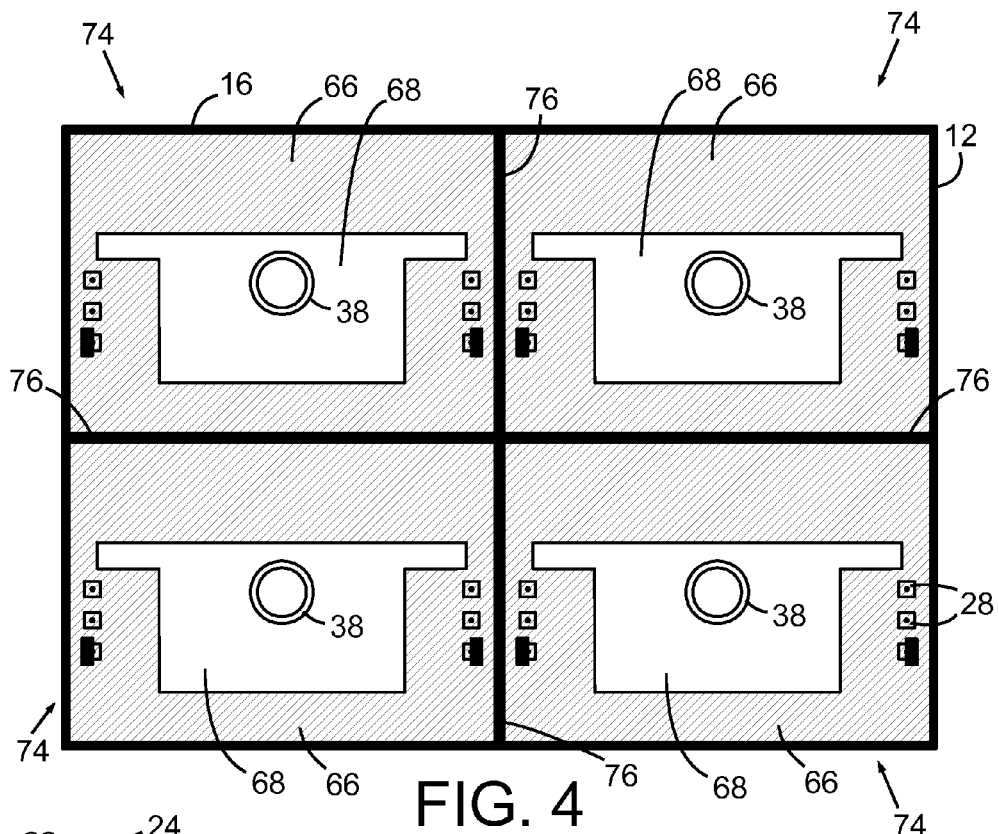
FIG. 4 is a plan interior view of an apparatus for authenticating a standardized document according to an additional embodiment of the invention, showing partitions of the apparatus.

Referring to FIG. 4, the area covered by the support 20 (FIGS. 1 and 2) and/or base 18 (FIGS. 1 and 2) may be subdivided into partitions, including subdividing the support 20 into equally sized partitions. In some embodiments, the support 20 and the base 18 are divided into four equally sized partitions, and the apparatus 10 includes four sets 74 of the camera 38, LEDs 28, mask 66 and left and right lower mask sections 62 and 64. In such embodiments, one quarter section of a standardized document is imaged by one set 74. Use of the sets 74 advantageously permits the apparatus to separately image different sections of a standardized document, and to accommodate differently sized documents.

Figure 5:
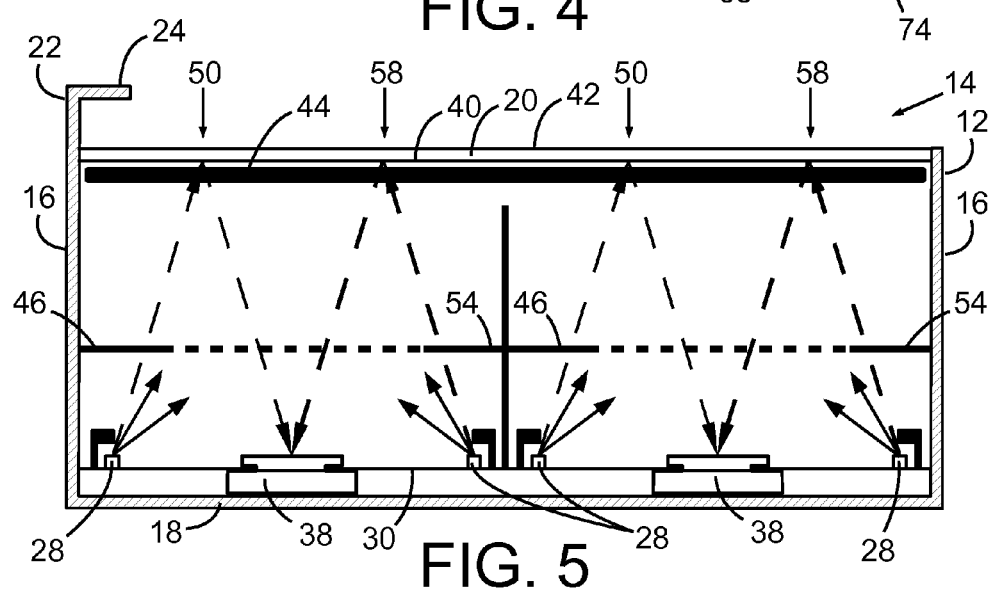
FIG. 5 is a side interior view of the apparatus shown in FIG. 4, showing a reduced height made possible by partitioning.

It can readily be seen in the side view of FIG. 5 that partitioning can be employed to advantageously reduce the height of the apparatus 10 relative to the unpartitioned embodiment shown in FIGS. 1 to 3, in respect of cameras 38 having the same angle of view. Additionally or alternatively, the height of the apparatus 10 may be reduced by the use of a camera 38 having a larger angle of view. As shown in FIG. 5, partitioned embodiments include one or more partition walls 76, which may partly extend vertically between the base 18 and the support 20. In some embodiments, one or more partition walls 76 may extend the entire height between the base 18 and the support 20. Preferably, the partition walls 76 extend at least as high as the highest mask or mask section, such as the mask sections 46 and 54 shown in FIG. 5. In some partitioned embodiments, the angle of view of adjacent cameras 38 may overlap, thereby advantageously facilitating registration of the partitioned images captured by the apparatus 10.

Figure 6:
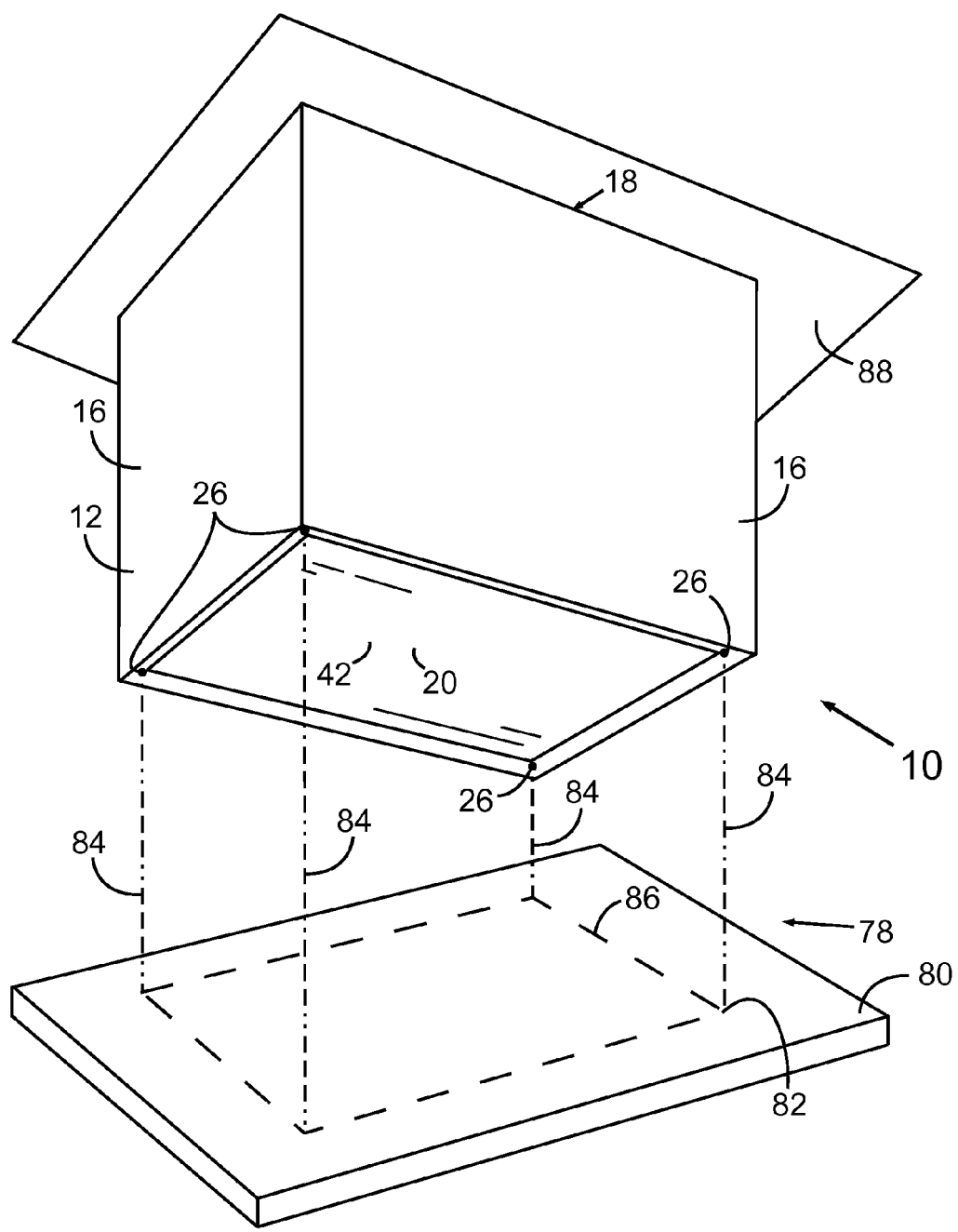
FIG. 6 is a perspective view of an apparatus for authenticating a standardized document according to a further exemplary embodiment of the invention.

Referring to FIG. 6, the apparatus 10 according to a further exemplary embodiment is operable to detect the presence of a standardized document (not shown in FIG. 6) positioned within a detection region 78, including the presence of the standardized document when positioned distally from the support 20.

In the exemplary circumstances illustrated in FIG. 6, the detection region 78 extends between the support 20 and an auxiliary support 80. The auxiliary support 80 may be any structure, device or fixture, or portion thereof, and is typically capable of supporting the standardized document. The detectors 26 are operable to detect the presence of the standardized document positioned within the detection region 78, including being positioned on or otherwise adjacent a receiving surface 82 of the auxiliary support 80. In at least some embodiments, all or part of the receiving surface 82 is reflective and suitable for redirecting optical beam(s) 84 from optical beam source(s) of the detectors 26 to corresponding optical beam receptor(s) of the detectors 26. The presence of a standardized document within the detection region 78 can be detected by the interruption of such optical beam(s) 84, for example. Additionally or alternatively, the detectors 26 may be proximity detectors (not shown) and/or motion detectors (not shown), for example.

Where the detectors 26 are located at each of four corners of the support 20, the detection region 78 extends between the support 20 and the auxiliary support 80 and a rectangular boundary 86 shown in FIG. 6 by a dashed line in the plane of the receiving surface 82. In general, however, any number of detectors 26 may be employed to detect the presence of a standardized document and the detection region 78 may be bounded by any boundary of suitable size having any shape.

As shown in FIG. 6, the apparatus 10 is mounted at its base 18 to a structure 88. The structure 88 can be any fixture such as a building wall, desk, shelf, etc. or other mounting device. The apparatus 10 is shown in FIG. 6 as having an orientation opposite to that shown in FIG. 1, such that the base 18 is above the detection region 78. However, in general the apparatus 10 may be oriented at any angle and in any direction.

In some embodiments, the apparatus 10 and the auxiliary support 80 are attached, such as by including brackets (not shown) extending between the apparatus 10 and the auxiliary support 80. Additionally or alternatively, the auxiliary support 80 can be mounted to or form part of the structure 88, for example.

In some embodiments, no auxiliary support 80 is employed and the detectors 26 are proximity sensors (not shown) or motion detectors (not shown) operable to detect the presence of a standardized document within a specifiable distance and/or angle from the support 20. Where no detector 26 is employed, other actuation means may be employed to initiate the imaging and/or authentication processes.

Thus, there is provided an apparatus for authenticating a standardized document, the apparatus comprising: (a) a source operable to illuminate the standardized document; (b) an imaging device operable to capture for authentication an image of the standardized document; and (c) a blind dimensioned to impede the apparatus from imaging an apparatus feature when said imaging device is capturing said image.

While embodiments of the invention have been described and illustrated, such embodiments should be considered illustrative of the invention only. The invention may include variants not described or illustrated herein in detail. For example, opposing pairs of sources may be provided along both a length and a width of the base of the apparatus, and the apparatus may include a correspondingly dimensioned blind. Thus, the embodiments described and illustrated herein should not be considered to limit the invention as construed in accordance with the accompanying claims.

| DRAWING LEGEND | |
| --- | --- |
| 10 | apparatus |
| 12 | housing |
| 14 | top region (of the housing 12) |
| 16 | walls |

-continued

| | DRAWING LEGEND |
|---|---|
| 18 | base |
| 20 | support |
| 22 | bracket |
| 24 | upper flange |
| 26 | detector |
| 28 | LED |
| 30 | PCB |
| 32 | IR LED |
| 34 | visible light LED |
| 36 | UV LED |
| 38 | camera |
| 40 | inner side (of the support 20) |
| 42 | outer side (of the support 20) |
| 44 | RF antenna |
| 46 | left side mask section |
| 48 | electromagnetic radiation beam |
| 50 | shadow region |
| 52 | unblocked electromagnetic radiation beams |
| 54 | right side mask section |
| 56 | electromagnetic radiation beam |
| 58 | shadow region |
| 60 | unblocked electromagnetic radiation beams |
| 62 | left lower mask section |
| 64 | right lower mask section |
| 66 | mask |
| 68 | cut-out (of the mask 66) |
| 70 | cut-out flange section |
| 72 | vertical portions |
| 74 | set (of partitioned components) |
| 76 | partition wall |
| 78 | detection region |
| 80 | auxiliary support |
| 82 | receiving surface |
| 84 | optical beam(s) |
| 86 | rectangular boundary |
| 88 | structure |

What is claimed is:

1. An apparatus for authenticating a standardized document, the apparatus comprising:
   (a) a housing comprising:
      (i) a support dimensioned to support the standardized document when it is being received by the apparatus,
      (ii) a base spaced-apart from and substantially parallel to said support, and
      (iii) at least one partition wall projecting from said base toward said support so as to define a plurality of partitions within said housing;
   (b) a detector operable to detect the presence of the standardized document when the standardized document is being received by the apparatus adjacent said support;
   (c) plurality of sources operable to illuminate the standardized document, each said source being disposed within one said partition, respectively; and
   (d) a plurality of imaging devices, each said imaging device being disposed within one said partition, respectively, each said imaging device being operable to capture for authentication an image of at least a portion of the standardized document,
   wherein the apparatus is operable to determine its location.

2. The apparatus of claim 1 wherein the apparatus is operable to cause said source to provide illumination when said detector is detecting the presence of the standardized document.

3. The apparatus of claim 2 wherein the apparatus is operable to cause said imaging device to capture said image when said source is providing said illumination.

4. The apparatus of claim 1 wherein the apparatus is operable to determine whether its said location is within a predefined permitted zone.

5. The apparatus of claim 4 further comprising an antenna for wireless communication, the apparatus being operable to wirelessly communicate at least one of its said location and an indication whether its said location is within said predefined permitted zone.

6. The apparatus of claim 5 wherein said antenna is a closed loop antenna having a loop plane substantially parallel to said support.

7. The apparatus of claim 6 wherein the apparatus is operable to wirelessly communicate information selected from the group consisting of: an indication of time, an indication of the presence of the standardized document, a digital representation of said image, an identification of the standardized document, and an indication whether the standardized document has been authenticated.

8. The apparatus of claim 1 wherein said support is anti-reflective.

9. The apparatus of claim 1 further comprising a bracket for receiving the standardized document, said bracket being attached to said housing adjacent said support, said detector being disposed at said bracket.

10. The apparatus of claim 1 wherein said plurality of sources comprises a first emitter operable to emit electromagnetic radiation having wavelengths in the ultraviolet range, a second emitter operable to emit electromagnetic radiation having wavelengths in the visible light range, and a third emitter operable to emit electromagnetic radiation having wavelengths in the infra-red range.

11. The apparatus of claim 10 wherein each said source comprises said first emitter, said second emitter, and said third emitter.

12. The apparatus of claim 10 wherein each said source comprises an opposingly disposed pair of said first emitters, an opposingly disposed pair of said second emitters, and an opposingly disposed pair of said third emitters.

13. The apparatus of claim 10 wherein at least one of said first emitter, said second emitter and said third emitter is mounted at an angle relative to said base, said angle being greater than zero degrees and less than ninety degrees.

14. The apparatus of claim 1 wherein each said imaging device is operable to capture for authentication a respective image of a respective portion of the standardized document.

15. An apparatus for authenticating a standardized document, the apparatus comprising:
   (a) housing means for housing components of the apparatus, said housing means comprising:
      (i) support means for supporting the standardized document when it is being received by the apparatus;
      (ii) partition means for defining a plurality of partitions within said housing means, said partition means projecting from a base toward said support means, said base being spaced-apart and substantially parallel to said support means;
   (b) detection means for detecting the presence of the standardized document when the standardized document is being received by the apparatus adjacent said support means;
   (c) illumination means for illuminating the standardized document from within each said partition;
   (d) imaging means for capturing from within each said partition images of at least portions of the standardized document, thereby permitting the apparatus to authenticate the standardized document; and
   (e) location determination means for determining the location of the apparatus,
   wherein said components comprise said illumination means and said imaging means.

16. The apparatus of claim 15 comprising receiving means for receiving the standardized document, said receiving means being attached to said housing means adjacent said support means, said detection means being disposed at said receiving means.

17. The apparatus of claim 15 comprising wireless communication means for wirelessly communicating at least one of said location and an indication whether said location is within a predefined permitted zone.

18. The apparatus of claim 15 wherein detection by said detection means causes said illumination means to illuminate.

19. The apparatus of claim 18 wherein illumination by said illumination means causes said imaging means to capture said images.

20. The apparatus of claim 15 wherein said illumination means is operable to emit electromagnetic radiation having wavelengths in the ultraviolet range, in the visible light range, and in the infra-red range.

* * * * *